(12) United States Patent
Volkl et al.

(10) Patent No.: US 9,979,175 B2
(45) Date of Patent: May 22, 2018

(54) ARRANGEMENT FOR SEALING THE CONNECTION POINT OF ELECTRICAL LINES

(71) Applicant: NEXANS, Paris (FR)

(72) Inventors: Dietmar Volkl, Plossberg (DE); Richard Riedel, Floss (DE)

(73) Assignee: NEXANS, Paris (FR)

( * ) Notice: Subject to any disclaimer, the term of this patent is extended or adjusted under 35 U.S.C. 154(b) by 0 days. days.

(21) Appl. No.: 14/861,446

(22) Filed: Sep. 22, 2015

(65) Prior Publication Data

US 2016/0099557 A1 Apr. 7, 2016

(30) Foreign Application Priority Data

Oct. 3, 2014 (EP) ..................................... 14306558

(51) Int. Cl.
*H02G 15/013* (2006.01)
*H02G 15/00* (2006.01)
*H01R 4/70* (2006.01)
*H02G 1/00* (2006.01)
*H02G 15/117* (2006.01)
*H01R 4/18* (2006.01)

(52) U.S. Cl.
CPC ............ *H02G 15/013* (2013.01); *H01R 4/70* (2013.01); *H02G 1/00* (2013.01); *H02G 15/003* (2013.01); *H02G 15/117* (2013.01); *H01R 4/183* (2013.01); *H01R 2201/26* (2013.01)

(58) Field of Classification Search
CPC .................................................. H02G 15/003

USPC .......................................................... 174/521
See application file for complete search history.

(56) References Cited

U.S. PATENT DOCUMENTS

| | | | | |
|---|---|---|---|---|
| 2008/0105461 A1* | 5/2008 | King | ...................... | H02G 3/081 174/535 |
| 2009/0050351 A1* | 2/2009 | Tolbert, Jr. | ............ | H02G 15/013 174/152 R |
| 2013/0014987 A1* | 1/2013 | Hofsaess | ............ | H01H 37/5427 174/554 |
| 2013/0133945 A1* | 5/2013 | Lee | ....................... | G01D 11/245 174/77 R |

FOREIGN PATENT DOCUMENTS

JP H02 257579 10/1990

OTHER PUBLICATIONS

Search Report dated 2015.

* cited by examiner

*Primary Examiner* — Hung V Ngo
(74) *Attorney, Agent, or Firm* — Sofer & Haroun, LLP

(57) ABSTRACT

An arrangement (20) for covering connecting points of electrical lines (2a-2c) in a moisture tight manner is indicated. The electrical conductors (3a-3d) of at least one first electrical line (1) are connected to the electrical conductors (4a-4f) with at least two further electrical lines (2a-2c). The connecting point is surrounded by a prefabricated housing (10) consisting of a mechanically stable synthetic material. The interior of the housing (10) is completely enclosed by a sealing material produced by injection molding which extends to both sides of the housing (10) up to the lines protruding beyond the housing (1, 2a-2c).

3 Claims, 2 Drawing Sheets

ARRANGEMENT FOR SEALING THE CONNECTION POINT OF ELECTRICAL LINES

RELATED APPLICATION

This application claims the benefit of priority from European Patent Application No. 14 306 558.9, filed on Oct. 3, 2014, the entirety of which is incorporated by reference.

BACKGROUND

Field of the Invention

The invention relates to an arrangement for moisture tight covering of the connection point of electrical lines, wherein the electrical conductor is connected by at least one first electrical line with the electrical conductors of at least two further electrical lines, as well as to a method of manufacturing such an arrangement.

Such an arrangement is, for example, a distributor arrangement. In electrical distributors electrical conductors, surrounded by insulation, are distributed from a certain first number of sheathed conductors to a second number which differ from the first. The following description of such an electrical distributor is representative of all other possible arrangements for a moisture tight covering of the connection of electrical lines.

Description of Related Art

For example, in electrical distributors, electrical conductors of a multi-strand sheathed conductor can be distributed over several single strand sheathed conductors. Such electrical conductors are used, for example, in industrial or solar plants or in motor vehicles. Particularly in trucks such distributors are used, for example, for dividing electrical supply currents as well as data and signal currents into ABS systems, control valves, various sensors, etc. in truck trailers.

In an electrical distributor, the conductor ends of the strands to be connected are conductively connected and the connection point is sealed in a media tight manner. For example, it is also possible to have passive electrical construction elements integrated in an electrical distributor, such as for example, diodes, circuit boards and resistors. The conductors can also be connected by clamping or crimping type connectors. It has to be ensured in this connection that the individual connection points between the conductors are electrically insulated relative to each other.

In accordance with a first known method, for example, a clamping type connector is used with a plastic sheathing material for connecting the conductor ends. Subsequently, the arrangement manufactured in this manner is injection molded in two molding processes in order to achieve the media tightness of the distributor. The second injection molding process is necessary because the arrangement in the injection molding tool must be kept at certain locations and so that at these locations, surface defects, holes and optical deficiencies can remain.

In accordance with a second known process, the uninsulated connectors connected to the conductor ends are placed in a placement part of synthetic material and fixed therein. The placement part is constructed in such a way that the individual connector locations of the conductors are insulated from each other. Subsequently, the placement part with the conductor connecting points placed therein is injection molded in an injection molding process in order to manufacture a media tight distributor. However, such a process is not suited for integrating electrical components such as diodes in the distributor because the placement parts are only suitable for relatively small dimensions. In connection with larger distributors, problems would occur during the injection molding process because in the case of large injection molding volumes accumulations of masses, surface depressions, undesirable hollow spaces and so-called blow holes may occur.

3. Objects and Summary

The invention is based the object of indicating an arrangement for the media tight covering of the connecting point of electrical lines, which makes available with only one injection molding process which is robust, free of vibrations, media tight as well as simple. In addition, an arrangement is to be indicated which provides for a process which can be made available by means of only one injection molding process.

In accordance with the invention, this object is met in that
- the connection point is surrounded by a prefabricated housing of a mechanically stable synthetic material, and,
- the interior of the housing is completely enclosed by a sealing material produced by injection molding which extends to both sides of the housing up to the lines protruding beyond the housing.

Because of the housing, the arrangement according to the invention is molded media tight and without defects in only a single injection molding process. The injection material surrounds the conductors or lines completely and fills out the housing completely in the same manner. As a result, the problem free sealing of the connection point is ensured relative to all media and particularly water. The prefabricated housing of mechanically stable synthetic material can be used for a variety of types of distributor arrangements. For a variety of applications with variable numbers and sizes of lines to be distributed, the same prefabricated housing can be used without having to change or modify the housing. The adjustment between the number of lines and the sizes of openings of the housing takes place substantially through the injection molding material which fills out the hollow spaces between the lines and the housing. The arrangement manufactured in this manner is particularly robust and vibration tight which is of particular importance for motor vehicles. Because of the predominant covering of the injection molded material by the housing, any optical deficiencies do not impair the qualitative impressions of the finished arrangement.

In accordance with a particularly preferred embodiment, the edges of the openings of the housing have sealing contours. The sealing contours are covered in a completely media tight manner by casting material which protrudes beyond the edges of the openings. After curing of the sealing contours, the sealing contours achieve an anchoring between the sealing contours and the housing, so that the strength and tightness of the arrangement according to the invention are further improved.

BRIEF DESCRIPTION OF THE DRAWINGS

Embodiments of the subject of the invention are illustrated in the drawings. In the drawings.

Figure 1:
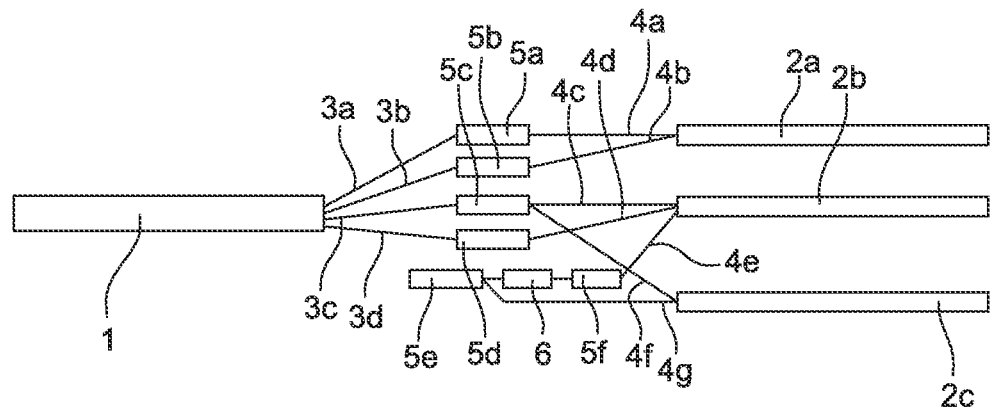
FIG. 1 schematically illustrates an example of connected strands of an electric distributor in accordance with an embodiment of the arrangement according to the invention.

In the drawings, equal method steps refer to equal technical features.

DETAILED DESCRIPTION

In the following, the invention will be explained with the aid of an electric distributor as it can be used in a motor vehicle. The electric distributor is further representative as an example of all other possible arrangements of moisture tight coverings of the electrical connections.

FIG. 1 shows a schematic example of a not yet sealed electric distributor. The strands 3a-3d of a first conductor 1 are distributed over the strands 4a-4f of 3 further electrical conductors, 2a-2c. In this example, the strands 3a-3d of the first conductor 1 with the strands 4a, 4b of the second conductor 2a and the strands 3c, 3d with the strands 4c, 4d of a third conductor 2b are connected. A fourth conductor 2c serves connect an electrical component 6, for example a passive electrical component such as a diode or a resistor by means of conductors, 4e-4g.

The strands are connected to electrical conductors provided with insulation which can, for example, consist of copper or aluminum or an alloy. The ends of the electrical conductors from which the insulation has been removed and subsequently each are connected with a connector 5a-5d, for example an insulated clamp connector. Connectors that have not come in contact with conductors can also be uninsulated crimp connectors. In the illustrated example, the electrical component is connected by means of two connectors 5e, 5f with the conductors 4e, 4g.

Figure 2:
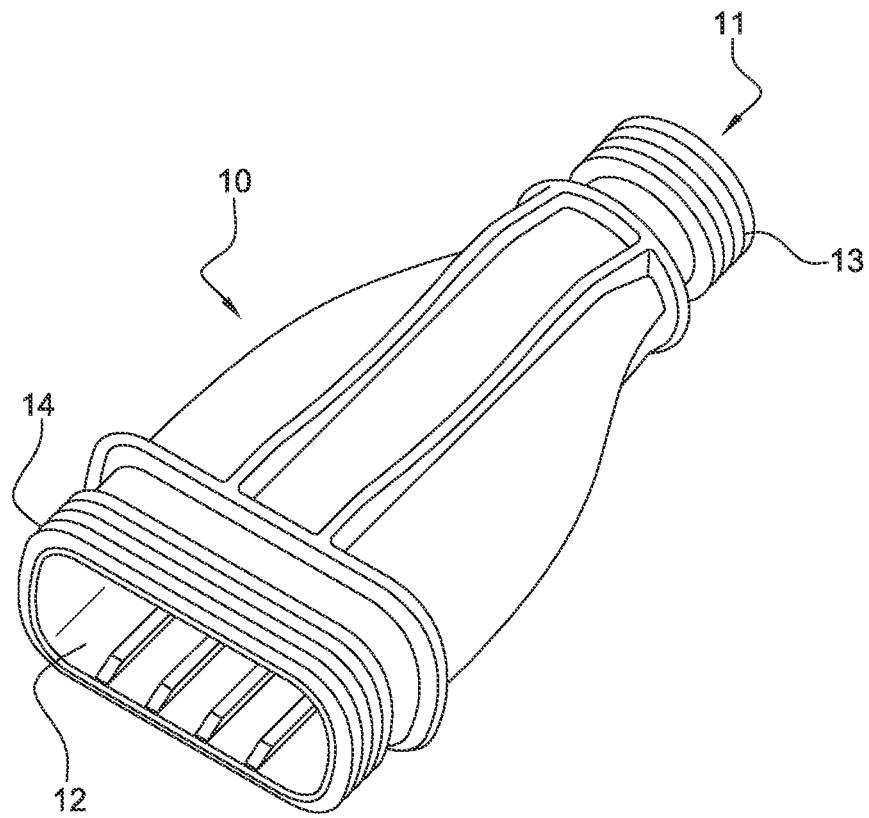
FIG. 2 shows the prefabricated housing of the invention in accordance with an embodiment in a perspective view.

FIG. 2 shows an embodiment of a housing 10 for an electrical distributor. The housing 10 consists of mechanically stable plastic material. This insulating material is, for example, polyamide thermoplastic polyurethane or polyethylene terephthalate. The housing 10 has two openings 11, 12 for the passing through of the conductor 1 on the one hand and the further conductors, 2a-2c on the other hand. The housing 10 serves for covering the connecting point between the conductors and so that all the conducting points between the individual electrical conductors of the distributor.

Figure 3:
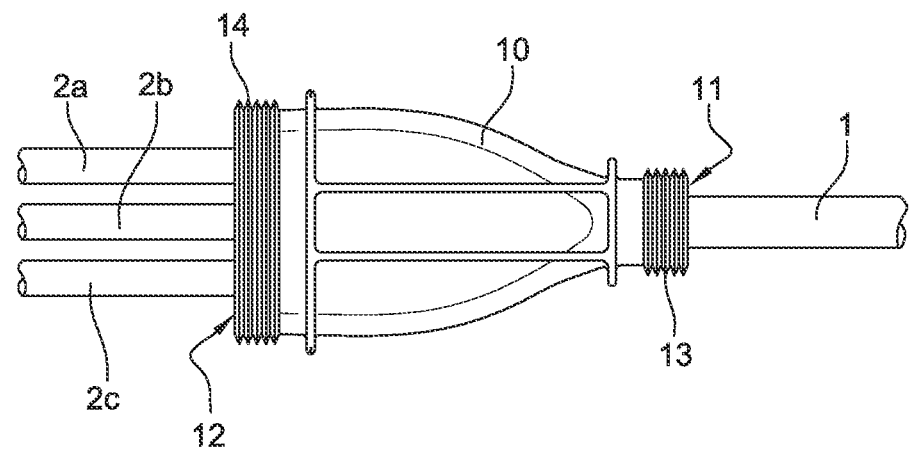
FIG. 3 shows the arrangement according to a method step according to the invention in a top view.

For manufacturing the electrical distributors, for example, the housing 10 is pushed over the first conductor 1 before the conductors are connected with each other. Subsequently, as illustrated in FIG. 1, the ends of all the conductors 1, 2a-2c connected to each other and the housing 10 are pushed over the connecting points. The result of the last step is illustrated in FIG. 3.

Figure 4:
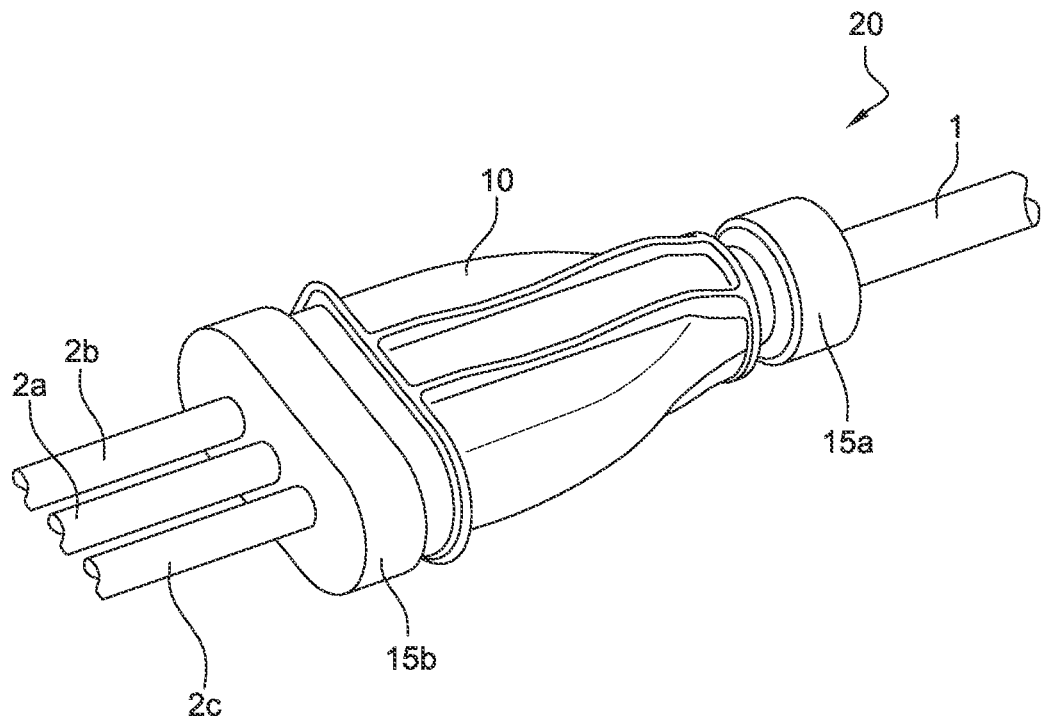
FIG. 4 shows the arrangement according another method step according to the invention in a perspective view.

In FIG. 4 an embodiment of a completed distributor 20 is illustrated. After the housing 10 is pushed over all the connecting points, the housing 10 with the continuous conductors is placed in an injection molding tool. The housing 10 is completely covered with injection molding material. As a result the connecting points between the individual conductors are entirely surrounded by injection molding material and thus are sealed media tight. In the illustrated example, the hardened injection molding material protrudes beyond the housing 10 and forms at the edges of the housing openings 11, 12 sealing elements 15a, 15b whereby the passage opening of conductors 1, 2a-2c are completely sealed through the openings 11, 12, completely sealed. The edges of the openings 11, 12 of the housing 10 are included in the injection molding process. The resulting shape of the injection molding material will be determined by the pre-pressed shape of the injection molding machine used.

To increase the strength of the connection between the injection molding material and the housing 10, especially on the openings 11, 12, they preferably have sealing contours 13, 14. These sealing contours can, for example, lamellar formed, as illustrated in FIGS. 2 and 4. By use of the sealing contours 13, 14 it is ensured that during the injection molding process the injection molding material spreads out within the sealing contours 13, 14 and is securely anchored after the cooling process. The density with respect to media of the distributor 20 as well as the strength would be further increased. The sealing contours 13, 14, which are or constitute the surfaces of the edges, can take other suitable shapes or forms. Depending on the housing and the injection molding material, the surfaces of the edges can however remain unstructured to achieve a good strength between the injection molding material and the housing 10.

The prefabricated housing 10 is structured in such a way that the size of the openings 11, 12 matches the number of conductors extending therethrough. The matches are a result of the application of the injection molding material. In this way it is possible to use prefabricated housings for a plurality of possible combinations of numbers of conductors. It is therefore possible to use the same housings for a multitude of different distributors.

The invention claimed is:

1. Method of manufacture of a cover for a moisture tight covering of a connection point of electrical lines, where the electrical conductors of at least one first electrical line is connected with the electrical conductors of at least two further electrical lines, said method comprising the steps of:
  surrounding the connection point with a prefabricated housing made of mechanically stable synthetic material, wherein the edges of the openings of the housing have sealing contours which are covered in a completely media tight manner by the injection molding material, and
  completely filling the interior of the housing by a sealing material produced by injection molding which extends on both sides of the housing over the lines protruding into the housing, wherein the injection molding material that protrudes beyond openings of the housing seals the openings in a media tight manner; and
  completely surrounding edges of openings of the housing through which the electrical lines pass in from the outside, sealing the openings in a media tight manner.

2. The method as claimed in claim 1, wherein the prefabricated housing is made from the group consisting of polyamide, thermoplastic polyurethane and polyethylene terephthalate.

3. Method according to claim 1, wherein the electrical conductors of the at least one first electrical line are connected by clamping connectors with the electrical conductors of the at least two further electrical lines.

* * * * *